Dec. 12, 1939.   B. L. CONTERMAN   2,183,445
FISHING LINE CLAMP
Filed Sept. 16, 1938
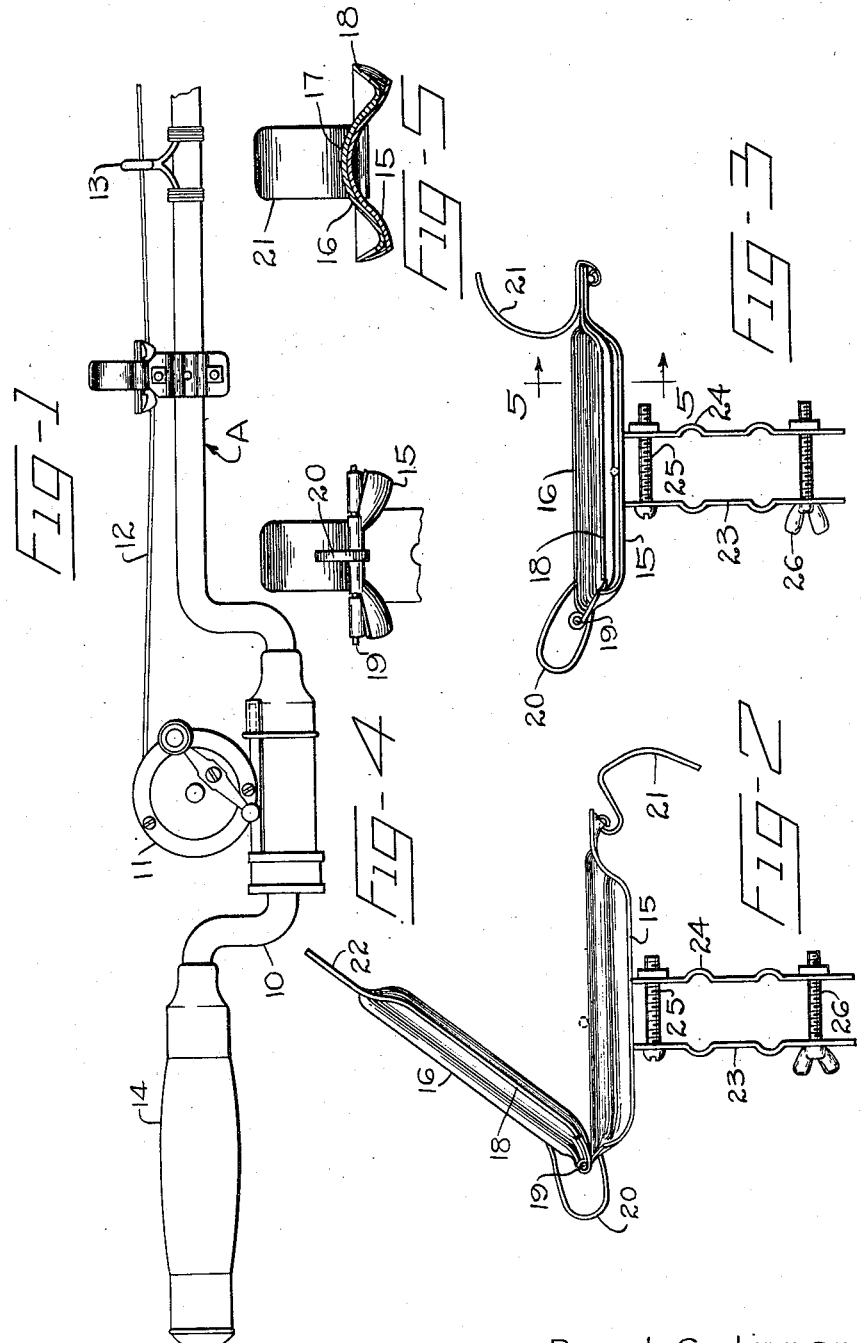
Bruce L. Conterman
INVENTOR
BY *Victor J. Evans & Co.*
ATTORNEYS Patented Dec. 12, 1939

2,183,445

UNITED STATES PATENT OFFICE 2,183,445

FISHING LINE CLAMP

Bruce L. Conterman, Central Square, N. Y.

Application September 16, 1938, Serial No. 230,308

1 Claim. (Cl. 24—248)

The invention relates to a clamp and more especially to a fishing line clamp.

The primary object of the invention is the provision of a clamp of this character, wherein the same is clipped to a fishing pole between the reel and the first guide next to said reel so as to engage the line and hold the same taut when such line is extended from the pole without damaging the line.

Another object of the invention is the provision of a clamp of this character, wherein the same can be opened with dispatch for the freeing of the line so as to allow a caught fish to run and also that will firmly grip the line so that the fishing hook can be jerked for the fitting of the hook in the mouth of the fish when caught, being no chance for the fish to get loose when caught by the hook.

A further object of the invention is the provision of a clamp of this character, which is simple in its construction, thorough reliable and efficient in operation, readily and easily controlled, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a fragmentary side elevation of a fish rod showing the clamp constructed in accordance with the invention.

Figure 2 is an enlarged end elevation of the clamp removed from the pole and the clamp in open position.

Figure 3 is a view similar to Figure 2 showing the clamp closed.

Figure 4 is a fragmentary elevation looking toward the hinged side of the clamp.

Figure 5 is a sectional view taken on the line 5—5 of Figure 3 looking in the direction of the arrows.

Similar reference characters indicate corresponding parts throughout the several views in the drawing.

Referring to the drawing in detail, A designates generally a portion of a fish pole having in this instance an offset portion 10 on which is fitted the reel 11, which is of conventional type, and the line 12 from this reel is trained through a guide eye 13 as is customary, the latter being fastened to the pole A in the usual well known manner. The offset 10 aligns the handle 14 with the major portion of the pole A while engageable with the pole is the line clamp constituting the present invention and hereinafter fully described.

The line clamp comprises stationary and movable jaws 15 and 16, respectively, these being concavo convexed at their centers 17 and the movable jaw has side flanges 18 thereon. The jaw 16 is hinged at 19 to the jaw 15, being a pintle type hinge, and active at the hinge 19 upon the movable jaw 16 is a leaf spring 20 which urges the release of the said jaw 16 from the jaw 15 upon the release of the snap latch hereinafter described. The line is adapted to be trained between the jaws so that when the jaw 16 is closed it will hold the line taut.

The jaw 15 on the side opposite the hinge 19 is equipped with a spring-like snap latch 21 engageable with a keeper lip 22 on the jaw 16 and in this manner the jaw 16 can be held in its closed position with relation to the jaw 15.

The jaw 15 has projecting therefrom spaced gripping arms 23, these being corrugated at 24, and such arms next to the jaw 15 are fitted with a nut-carrying bolt 25 to limit the spreading of such arms while next to the free ends of the said arms and engaged therein is an adjusting bolt 26. The pole A is received between the arms 23 preferably between the corrugations 24 therein and by the bolts 25 and 26 such arms will firmly clamp the pole, being preferable that the clamp be mounted betwen the reel 11 and the guide eye 13 upon the said pole.

In the use of the clamp, the line 13 is passed between the jaws 15 and 16 when such line is trained through the eye 13 and upon the closing of the jaw 16 with relation to the jaw 15 the line 12 will be firmly clamped. It is possible to readily release the line 12 particularly when the latter is to be let out from the reel 11 and when such line is gripped by the jaws 15 and 16 it will be held fixed so that jerking of the line for the hooking of fish can be had without relying on the reel 11 for this purpose.

What is claimed is:

A line clamp for fastening to a fishing pole, comprising matched undulated stationary and movable jaws, side flanges formed on the movable jaw, a pintle type hinged connection between the jaws, a leaf spring associated with both jaws next to the pintle hinge connection and active for the swinging of the movable jaw away from the stationary jaw, a spring-like snap latch carried by the movable jaw and having an upwardly and outwardly extending inwardly curved finger-engaging piece, and a keeper lip formed on the stationary jaw in the path of said latch for engagement thereby and the holding of the jaws in closed relation to each other.

BRUCE L. CONTERMAN.